(12) United States Patent
Byamugisha et al.

(10) Patent No.: US 11,599,194 B2
(45) Date of Patent: Mar. 7, 2023

(54) SPATIAL GUIDANCE SYSTEM FOR VISUALLY IMPAIRED INDIVIDUALS

(71) Applicant: International Business Machines Corporation, Armonk, NY (US)

(72) Inventors: Joan Byamugisha, Johannesburg (ZA); Richard Allen Young, Johannesburg (ZA); Toby Kurien, Midrand (ZA); Naweed Aghmad Khan, Johannesburg (ZA); Maletsabisa Molapo, Pretoria (ZA)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 16/882,399

(22) Filed: May 22, 2020

(65) Prior Publication Data

US 2021/0365119 A1    Nov. 25, 2021

(51) Int. Cl.
*G06F 3/01* (2006.01)
*G08B 6/00* (2006.01)
(Continued)

(52) U.S. Cl.
CPC ............ *G06F 3/016* (2013.01); *A41F 19/00* (2013.01); *A61H 3/068* (2013.01);
(Continued)

(58) Field of Classification Search
CPC ......... G06F 3/016; A41F 19/00; A61H 3/068; A61H 2003/063; A61H 2201/5007; A61H 1/008; A61H 3/061; A61H 2201/1652; A61H 2201/5097; G01C 21/3652; G08B 6/00
See application file for complete search history.

(56) References Cited

U.S. PATENT DOCUMENTS

| | | |
|---|---|---|
| 5,144,294 A | 9/1992 | Alonzi et al. |
| 5,806,017 A | 9/1998 | Hancock |

(Continued)

FOREIGN PATENT DOCUMENTS

| | | |
|---|---|---|
| EP | 2395495 A2 | 12/2011 |
| EP | 3213177 A1 | 10/2014 |

(Continued)

OTHER PUBLICATIONS

Feb. 21, 2008; USFS, "How GPS Works." http://www.fs.fed.us/database/gps/aboutgps/begincor.htm#top (Year: 2008).*

(Continued)

*Primary Examiner* — Nabil H Syed
*Assistant Examiner* — Cal J Eustaquio
(74) *Attorney, Agent, or Firm* — Shimon Benjamin; Otterstedt & Kammer PLLC

(57) ABSTRACT

Method, systems, and apparatus to facilitate navigation in a known environment. Communication and tracking between a receiver device and one or more beacons are provided to identify a current position of the receiver device. A direction to a next waypoint of a current path is determined based on the identified current position and a haptic feedback system is signaled to provide continuous haptic feedback to orient a user in the identified direction.

17 Claims, 9 Drawing Sheets

(51) Int. Cl.
*A41F 19/00* (2006.01)
*A61H 3/06* (2006.01)
*G01C 21/36* (2006.01)

(52) U.S. Cl.
CPC .......... *G01C 21/3652* (2013.01); *G08B 6/00* (2013.01); *A61H 2003/063* (2013.01)

(56) References Cited

U.S. PATENT DOCUMENTS

| | | |
|---|---|---|
| 6,895,330 B2 | 5/2005 | Cato et al. |
| 8,718,936 B2 | 5/2014 | Fountain |
| 9,201,143 B2 | 12/2015 | Slamka |
| 9,311,827 B1 | 4/2016 | Alqahtani |
| 9,510,993 B2 | 12/2016 | Te |
| 9,578,307 B2 | 2/2017 | Moore et al. |
| 9,710,564 B2 | 7/2017 | Jarvis |
| 9,733,086 B2 | 8/2017 | Forutanpour et al. |
| 9,993,384 B1 | 6/2018 | Chen et al. |
| 2009/0076723 A1* | 3/2009 | Moloney ............ G01C 21/3652 701/472 |
| 2009/0132158 A1 | 5/2009 | Sironi et al. |
| 2013/0218456 A1* | 8/2013 | Zelek .................. G01C 21/20 701/411 |
| 2013/0332070 A1* | 12/2013 | Fleizach ............ G01C 21/3679 701/438 |
| 2014/0100773 A1 | 4/2014 | Cunningham et al. |
| 2014/0142851 A1 | 5/2014 | Larmo et al. |
| 2014/0184384 A1 | 7/2014 | Zhu et al. |
| 2015/0330787 A1 | 11/2015 | Cioffi et al. |
| 2017/0270827 A1 | 9/2017 | Channabasappa et al. |
| 2018/0169702 A1 | 6/2018 | Houston et al. |

FOREIGN PATENT DOCUMENTS

| | | | |
|---|---|---|---|
| EP | 3182254 A2 * | 6/2017 | ............ A41D 1/002 |
| WO | WO1998008108 A1 | 2/1998 | |
| WO | WO2018204745 A1 | 5/2017 | |

OTHER PUBLICATIONS

Cheraghi et al., GuideBeacon: Beacon-Based Indoor Wayfinding for the Blind, Visually Impaired, and Disoriented, In 2017 IEEE International Conference on Pervasive Computing and Communications (PerCom), pp. 121-130. IEEE, 2017.

Beaumont et al., Wearable device for navigation assistance, IP.Com, IPCOM000233994D, Jan. 6, 2014, 2 pages.

* cited by examiner

SPATIAL GUIDANCE SYSTEM FOR VISUALLY IMPAIRED INDIVIDUALS

BACKGROUND

The present invention relates to the electrical, electronic and computer arts, and more specifically, to a spatial guidance system for individuals.

One of the biggest challenges for visually impaired persons is achieving independent mobility, typically using reference locations to navigate within a familiar environment. These reference points range from the location and position of furniture within a space to trees, park benches, and lampposts located outdoors. Typically, reaching each reference point conveys both that one is moving in the right direction and what to expect going forward, in terms of the next expected reference point. It often happens, however, that between leaving one reference point and reaching the next, a visually impaired person can miss the next reference point and become disoriented due to taking a wrong turn, making a slight deviation in direction, and the like. Guiding the visually impaired person back to her or his last reference point (or to the nearest reference point) is often required to enable him or her to recognize where she or he is and to reorient his or her intended direction.

SUMMARY

Principles of the invention provide techniques for providing spatial guidance to visually impaired individuals. In one aspect, an exemplary method to facilitate navigation in a known environment includes the operations of providing communication and tracking between a receiver device and one or more beacons to identify a current position of the receiver device; determining a direction to a next waypoint of a current path based on the identified current position; and signaling a haptic feedback system to provide continuous haptic feedback to orient a user in the identified direction.

In one aspect, a non-transitory computer readable medium comprises computer executable instructions which when executed by a computer cause the computer to perform the method of: providing communication and tracking between a receiver device and one or more beacons to identify a current position of the receiver device; determining a direction to a next waypoint of a current path based on the identified current position; and signaling a haptic feedback system to provide continuous haptic feedback to orient a user in the identified direction.

In one aspect, an exemplary system includes a haptic feedback system configured to provide haptic feedback to a user; and a smart device in communication with the haptic feedback system. The smart device is configured to provide communication and tracking between a receiver device and one or more beacons to identify a current position of the receiver device; determine a direction to a next waypoint of a current path based on the identified current position; and signal the haptic feedback system to provide continuous haptic feedback to orient the user in the identified direction.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

continuous haptic feedback for orienting and reorienting a visually impaired individual in a familiar environment;

user selection of reference points;

hands-free operation;

elimination of the need for audio cues from a navigation system and thereby the need for headphones or other listening devices;

the ability for the user to be oriented towards a selected reference point;

continuous haptic feedback that enables a user to move quickly and safely through a known space by eliminating the pauses normally required for user re-orientation; and a continuous haptic feedback mechanism that orients the user accurately towards a selected reference point, a nearest reference point, a previously encountered reference point, and the like.

These and other features and advantages of the present invention will become apparent from the following detailed description of illustrative embodiments thereof, which is to be read in connection with the accompanying drawings.

DETAILED DESCRIPTION

Figure 1:
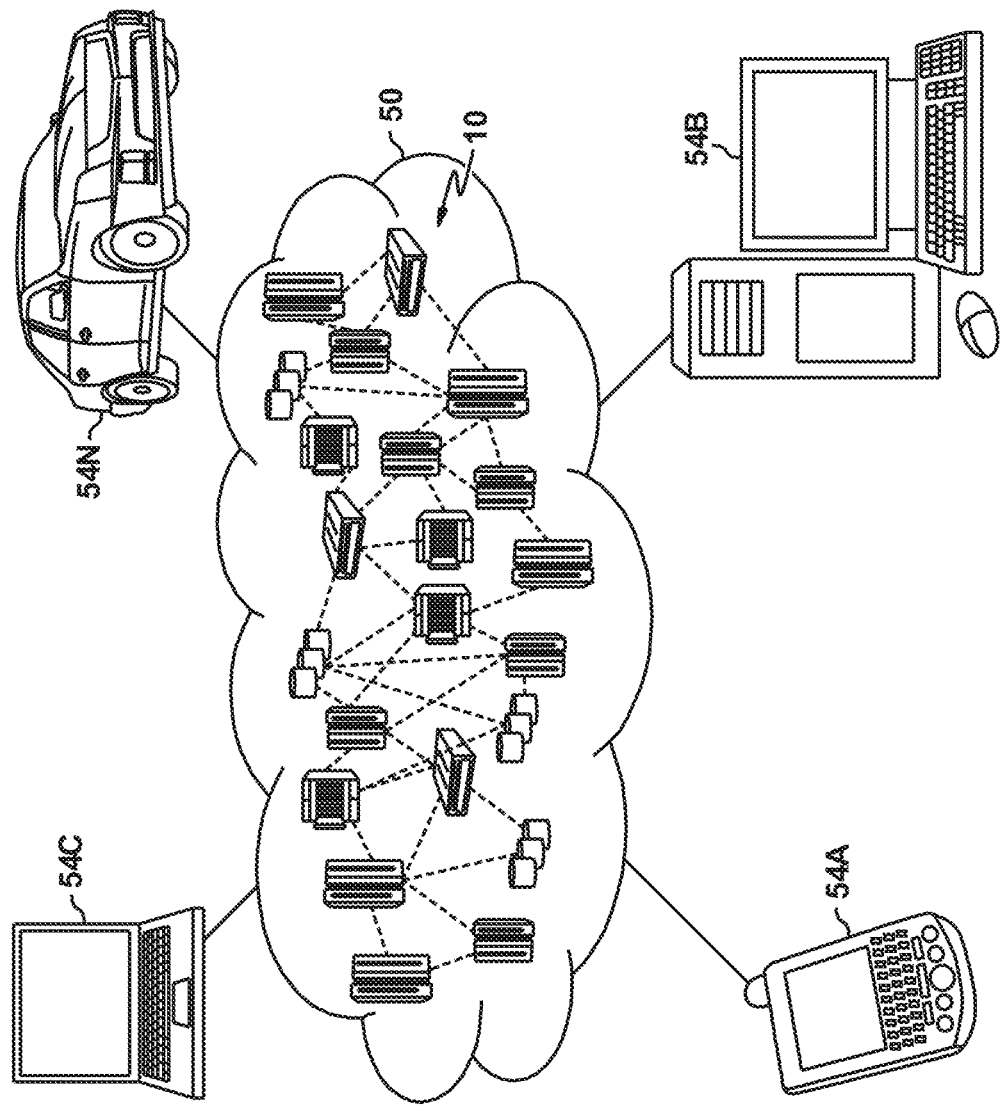
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
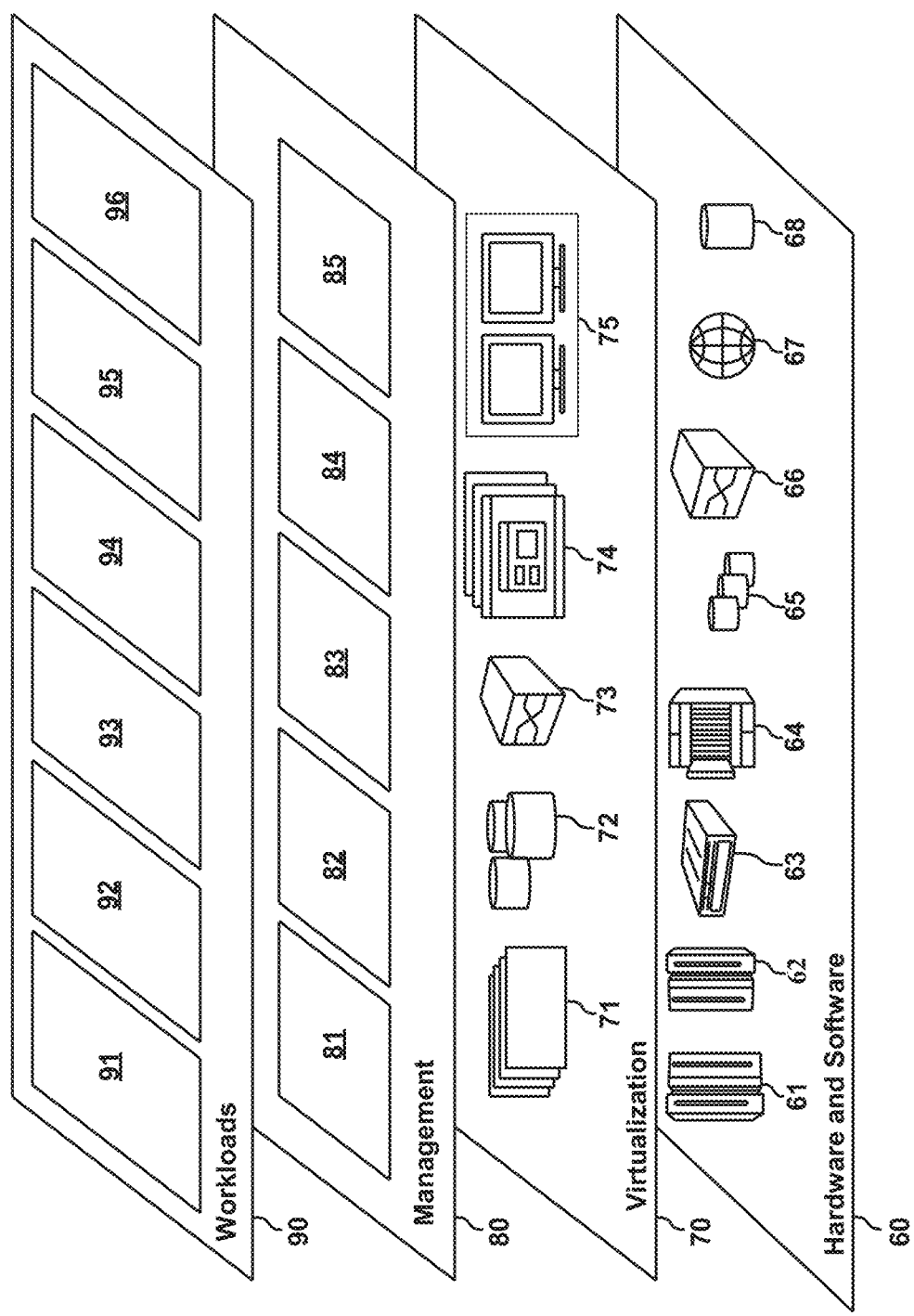
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and guidance system 96.

Generally, apparatus, systems, and methods are disclosed that facilitate orientation and navigation for visually impaired individuals in, for example, a large but familiar environment (such as at home, at work, and the like). Cloud, non-cloud, and mixed cloud/non-cloud implementations are possible. In one or more embodiments, the system guides an individual, such as a disoriented individual, to a familiar reference point (note that fixed known location, reference point, reference spot, reference marker, and waypoint are used interchangeably herein). In one or more embodiments, this includes enabling the visually impaired individual, with or without the assistance of a sighted person, to place waypoint beacons at reference points, and to have the system provide guidance to a reference point, such as the last encountered waypoint or the closest waypoint, by continuous haptic feedback to the individual. Thus, a visually impaired person can effortlessly navigate in her or his environment without prolonged periods of disorientation. In one example embodiment, the system learns the physical path(s) most commonly taken by the user and develops a spatio-temporal model of each path that the user travels between waypoints.

In addition, in one or more embodiments, the system has a disorientation detector so that the user is automatically guided to a reference point when the individual appears to be disoriented. (As used herein, the user is the visually impaired individual receiving assistance.) This allows the user to effortlessly recognize reference waypoints and to be properly oriented within the user's environment.

Figure 3A:
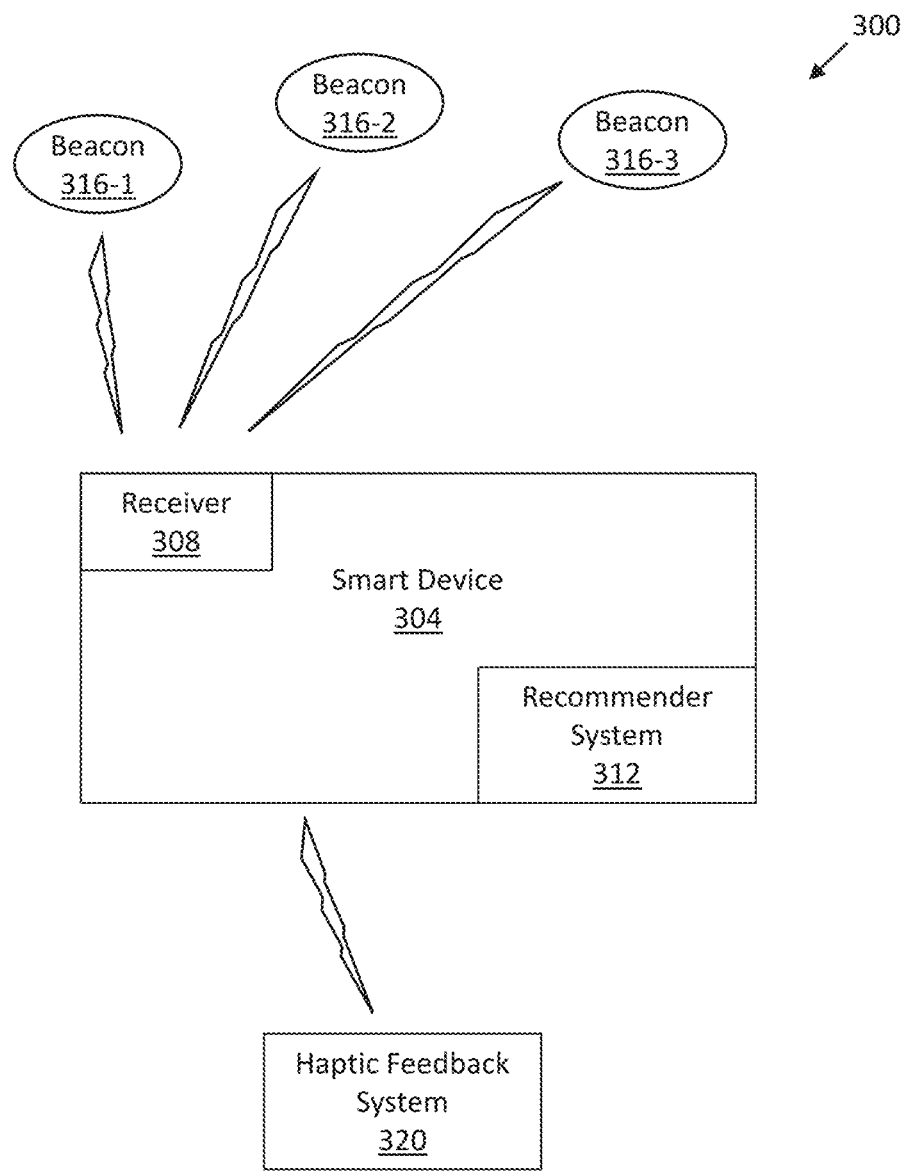
FIG. 3A is a block diagram of an example system for establishing the location of locator beacons and providing haptic feedback to spatially orient a user, in accordance with an example embodiment.

FIG. 3A is a block diagram of an example system 300 for establishing the location of locator beacons 316-1, 316-2, 316-3 (collectively referred to as locator beacons 316 herein) and providing haptic feedback to spatially orient a user, in accordance with an example embodiment. More or fewer beacons can be used in other embodiments. In one example embodiment, physical reference points familiar to the user are transformed into electronic waypoints that guide the user to one of the reference points. The reference point may be the closest reference point, the starting reference point of a journey, the last encountered reference point, a reference point specified by the user, a default reference point, and the like. One or more locator beacons 316 are placed at locations designated by the user or other individual as a reference marker that is perceived to be helpful by the user. For example, a locator beacon may be placed by a door located across from a staircase where the locator beacon can be used to orient the user towards the door as the user exits the staircase. The locator beacons 316 are, for example battery-powered, Bluetooth Low Energy (BLE) beacons. These devices are often capable of running for a year or more on batteries. A receiver 308, computing device 304 (also referred to as a smart device 304 herein), and haptic feedback system 320 provide guidance feedback to a user as the user traverses the environment.

Contextual indicators of commonly used reference spots not in the knowledge base are identified by the smart device 304 and a recommender system 312 may suggest possible waypoints to the user to be added to the knowledge base. These are virtual waypoints, that is, waypoints that do not have locator beacons 316 presently located by them, but their location is identified by triangulating signals from existing locator beacons 316.

Recommending additional waypoints is done by identifying user triggered reorientation and self-oriented signals. For example, if a user frequently becomes disoriented at a particular spot, the recommender system 312 can suggest adding a virtual waypoint at that location to help guide the user along the user's path.

Figure 3B:
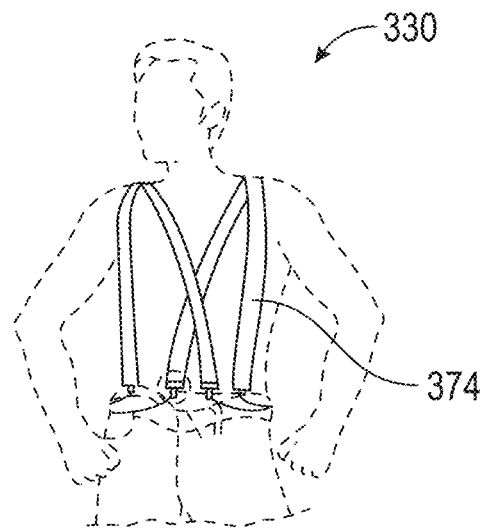
FIG. 3B is an illustration of an example suspender-based haptic feedback wearable device, in accordance with an example embodiment.
Figure 3C:
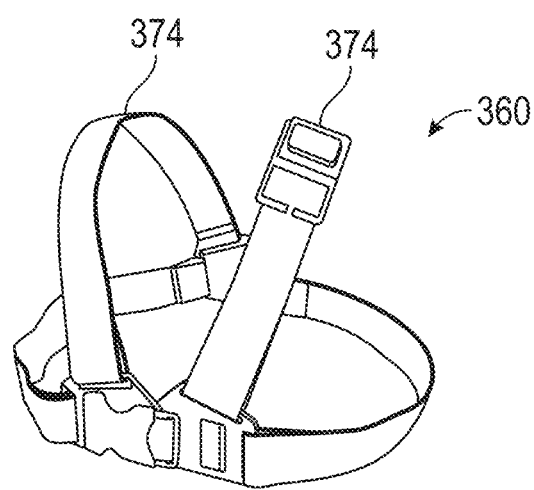
FIG. 3C is an illustration of an example chest-mounted haptic feedback wearable device, in accordance with an example embodiment.
Figure 3D:
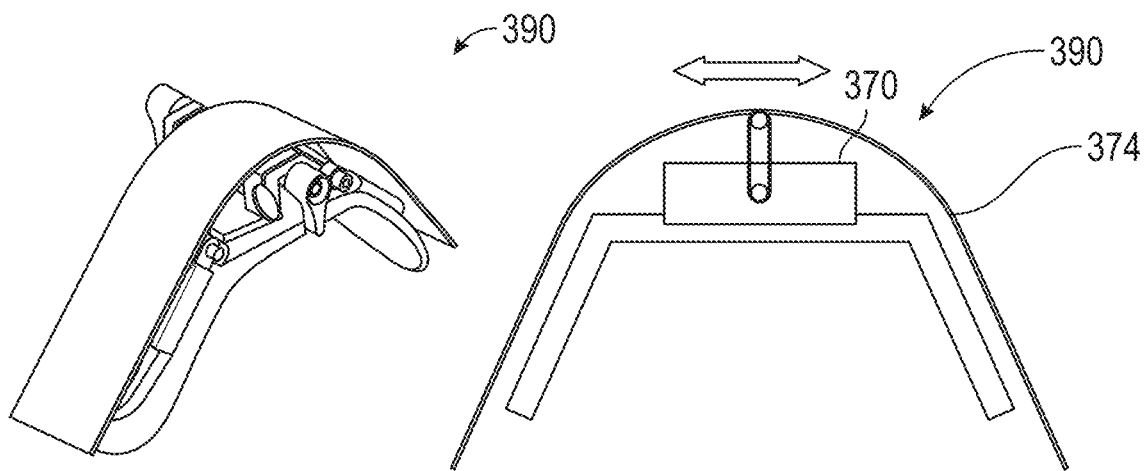
FIG. 3D is an illustration of two side-views of a motorized shoulder apparatus, in accordance with an example embodiment.

In one example embodiment, the haptic feedback system 320 is in the form of a wearable device, such as suspenders, that are worn over the user's shoulders. FIG. 3B is an illustration of an example suspender-based haptic feedback wearable device 330, in accordance with an example embodiment. FIG. 3C is an illustration of an example chest-mounted haptic feedback wearable device 360, in accordance with an example embodiment. FIG. 3D is an illustration of two side-views of a motorized shoulder apparatus 390, in accordance with an example embodiment. As illustrated in FIG. 3D, a servo motor 370 is connected to a corresponding strap 374 of the suspender-based wearable device 330 or the chest-mounted wearable device 360. The example suspender-based wearable device 330 may be clipped to a belt or pants worn by the user, and can be worn underneath the user's shirt or top, making the suspender-based wearable device 330 unobtrusive to the user when not in use. The servo motor 370 can move forward or backward to adjust tension in the strap 374, which provides the continuous haptic feedback to the user. The receiver 308 and smart device 304 interact with the user, as well as with motors (not shown) coupled to the suspenders that allow the left and right suspenders to be tensioned individually at the direction of the smart device 304. The left and right tension in the suspenders act as the continuous haptic feedback to the user, accurately orienting the user in the correct direction. Each suspender can be tensioned at the back or the front, or both at the same time, providing intuitive feedback to the user. For example, tensioning both suspenders to the front means the reference point is directly in front of the user, tensioning both suspenders to the back means the reference point is directly behind the user, tensioning the left suspender in the back and the right suspender in the front means the reference point is towards the left, and the like.

The receiver 308 uses the signal strength from two or more directional antennae (not shown) to determine the orientation of the locator beacon 316 relative to the user. This is then used to drive the control of the haptic feedback motors attached to the suspenders. In a non-limiting example, the well-known angle of arrival (AoA) technique can be employed. When combined with the signal strength, this can provide enough information to triangulate the distance and direction of the beacon from the user. Bluetooth 5.1 implements this approach, for example. One or more embodiments can accordingly be implemented using Bluetooth 5.1 or newer transmitter and receiver modules using the AoA method. In noisy environments, an implementation of a Kalman Filter can be used to improve accuracy. Given the teachings herein, the skilled artisan will be able to utilize known techniques such as AoA. Bluetooth 5.1 or higher, and/or Kalman filters to implement one or more embodiments.

User Disorientation and Reorientation

If the user becomes disoriented, the haptic feedback system 320 can guide the user to a waypoint. The haptic feedback system 320 can be engaged by the user pressing a button or otherwise indicating that the user is disoriented, and the device will use haptic feedback to guide the user to a waypoint. In one example embodiment, the button may be attached to the suspender-based haptic feedback wearable device 330, a user's smartphone, a visually-impaired cane (see FIG. 6), a visually-impaired peripheral assistive device, and the like. In one example embodiment, the user may indicate disorientation to a smart assistant, a virtual assistant, a digital application or web-service via hand signals, voice commands or trigger sounds that are identified by a user's smart phone, a smart home speaker device, a hands-free device, facial features or body movements that are identified by a user's home camera system, a smart Wi-Fi gesture recognition system, a smartphone camera or radar gesture recognition system, and the like. In one example embodiment, once engaged, the haptic feedback system 320 continuously guides the user to the waypoint. In one example embodiment, the haptic feedback system 320 is continuously engaged and continuously guides the user to the waypoint, regardless of whether the user is disoriented.

Additionally, waypoints can be labelled and identified by means of short haptic feedback patterns. For example, waypoint number one can be identified by a single short burst of haptic feedback and waypoint number two by two short bursts. This identification can be provided before navigation starts and/or when the waypoint is encountered, giving the user the ability to know which waypoint the user is being oriented towards or are currently located by. If the user wants to be directed to a specific waypoint, a second button or other mechanism allows the user to cycle through waypoints to be directed to or to specifically identify a particular waypoint. In one example embodiment, trigger mechanisms similar to those used by a user to engage the haptic feedback system 320 are also used to specify a waypoint.

Automatic Disorientation Detection

During system use, data is collected and used to train a model to detect disorientation of the user; the detection will often occur before the user has even realized she or he is disoriented. This can be implemented as a Recurrent Neural Network, a Long short-term memory (LSTM) network, or similar machine learning model. The model learns the physical path(s) most commonly taken by the user by looking at the distance to each waypoint over a time series of samples of the location of the user in the environment and develops a spatio-temporal model of each path that the user travels between waypoints. This allows the paths between waypoints to be more complex than straight lines. In one example embodiment, data recorded from the time period shortly before the current time is used as input to the model so as to determine the direction of travel along a current path of the user.

In one example embodiment, disorientation detection becomes a binary classification problem with the traversal paths and timestamps as inputs. Initially, the model may be biased with a class imbalance against disorientation since the user has not manually labelled the data as a disorientation sample. As additional disorientation samples are collected and the model is retrained, the model may suggest a reorientation to the user. Where a false positive disorientation signal is presented to the user and dismissed or ignored, these signals are also used to retrain the model and correct the incorrectly detected sample label. A decreasing false positive rate of ignoring or dismissing a disorientation signal quantifies sufficient data collection. In one example embodiment, the model can use few-shot learning for inter-waypoint disorientation detection, using disorientation samples between two waypoints to identify disorientation signals between two secondary waypoints that have different spatio-temporal signatures. The skilled artisan will be familiar with few-shot learning, which refers to the practice of feeding a learning model with a very small amount of training data, contrary to the normal practice of using a large amount of data.

Once enough data has been collected and common paths between waypoints have been identified, the model is able to detect when the user deviates from a known path and to alert the user to the disorientation. The user can then either be automatically reoriented to a waypoint, or can dismiss the reorientation, either by deliberately ignoring the reorientation haptic feedback for a set period of time, by pressing a physical button on the device, and the like.

In one example embodiment, user motion and user behavior are used as input to the disorientation model. An example training label sequence for the disorientation model is: detecting rapid movement or unexpected drift of the user in between waypoints, followed by a sudden stationary motion, and then manually activating reorientation. Once sufficient training labels have been obtained, the system is able to activate reorientation without needing any intervention or prompting by the user.

Saving Non-Beacon Waypoints as Fixed Reference Points

In one example embodiment, virtual beacons are saved into a knowledge base (e.g. in memory 28 discussed below with respect to FIG. 7) using the smart device 304 and gesture recognition, physical buttons, virtual buttons, audio instructions, virtual assistant interaction, and the like. The virtual beacons are established without the deployment of the physical locator beacons 316 and may be based on fixed reference spots (such as trees, building edges, furniture, and the like) that a visually impaired person may naturally use when navigating in a familiar environment. The orientation signals registered by the smart device 304 are stored in the knowledge base and a spatio-temporal machine learning model incorporates triangulation techniques between the physical locator beacons 316 to identify, signals that correspond to virtual beacons. In one example embodiment, the triangulation model can be stored and run on the smart device 304 and the virtual beacon can operate identically to a physical locator beacon 316 to all subsystems outside of the smart device 304.

Establishing Beacons as Reference Points

Figure 4:
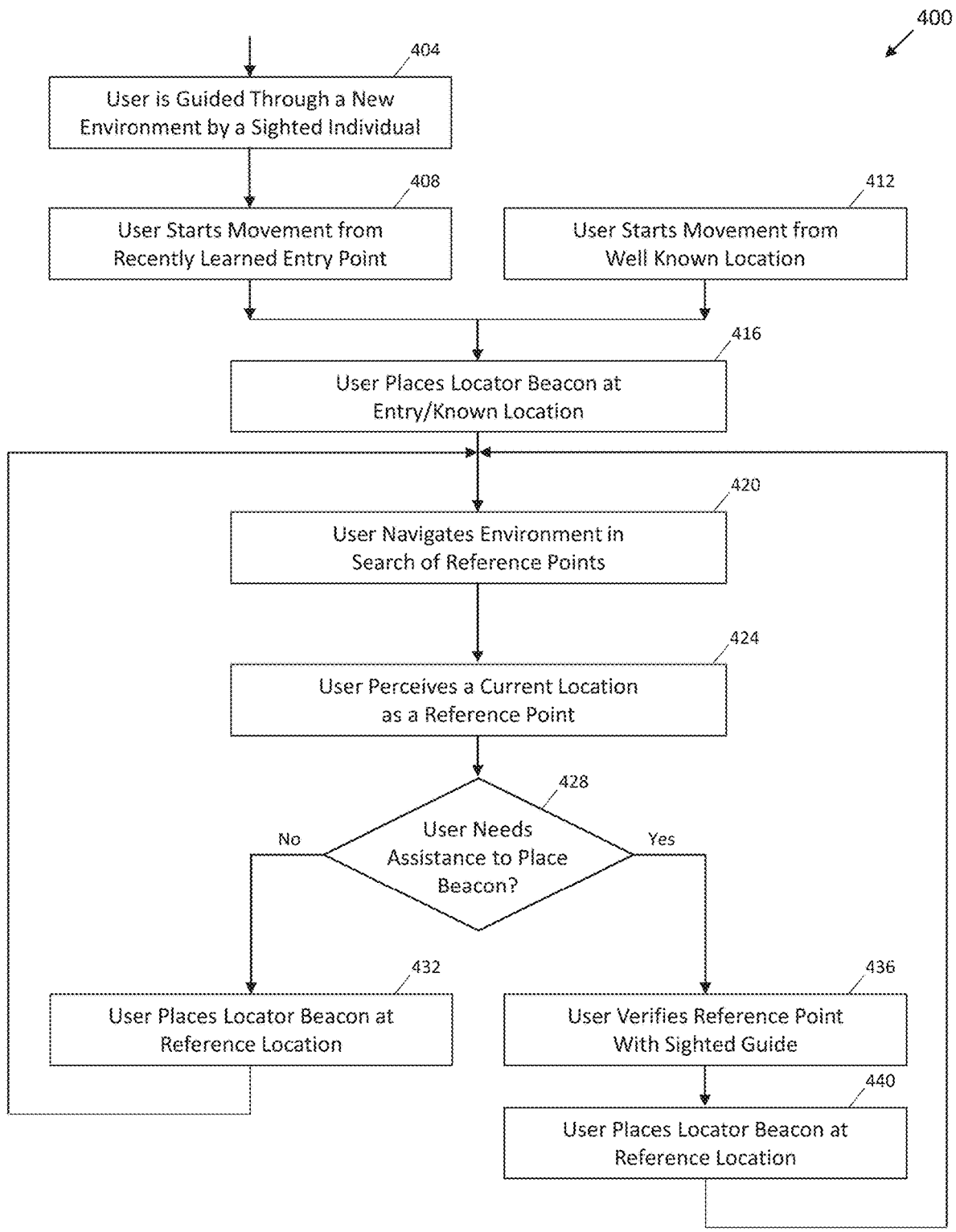
FIG. 4 is an example workflow for establishing the location of locator beacons, in accordance with an example embodiment.

FIG. 4 is an example workflow 400 for establishing the location of locator beacons, in accordance with an example embodiment. In one or more embodiments, the initial system setup includes the user independently placing locator beacons 316 (to be used as waypoints), which can be done with or without the help of a sighted guide. In an independent set up scenario, the user starts at a well-known location and places a locator beacon 316 there. The user navigates around the environment as she or he normally would (such as using a white cane) and places more locator beacons 316 at other locations known to the user; each locator beacon 316 is assigned a location identifier such that a user can correlate an identity of a reference location with an identifier for a particular locator beacon 316. Once the locator beacons 316 are deployed, the haptic feedback system 320 orients the user to the appropriate beacon/waypoint. The haptic feedback cues may be continuously engaged, engaged only when the user is perceived to be disoriented, engaged only when the user indicates that the user is disoriented, and the like.

In one example embodiment, a user is guided through a new environment by a sighted individual (operation 404). The user starts movement from a recently learned entry point (operation 408) or from a location well known to the user (operation 412). The user places a locator beacon 316 at the well-known location and/or entry point (operation 416). The user navigates the environment with the assistance of a sighted individual, touch, a cane, and the like (operation 420). At some point, the user perceives that a current location is a desirable reference point (operation 424) and a determination is made of whether the user needs sighted assistance to place the beacon (operation 428) (e.g. based on input from the user). In one example embodiment, the visually impaired user, based on the user's navigation experience, will choose the location for the beacon—a location the user wishes to be navigated to in the event of future disorientation. If the user does not need sighted assistance (NO branch of operation 428), the user places a locator beacon 316 at the identified reference point (operation 432) and the workflow 400 proceeds with operation 420. If the user needs sighted assistance (YES branch of operation 428), the user verifies the location/reference point with the assistance of a sighted guide (operation 436) and places a locator beacon 316 at the identified reference point with the assistance of the sighted individual, if the reference location has been verified (operation 440). The workflow 400 then proceeds with operation 420. The process continues until a sufficient number of beacons have been placed. In one example embodiment, the number of locator beacons 316 is based on the ability of the user to independently navigate from an entry point to each next reference point without experiencing disorientation.

Figure 5A:
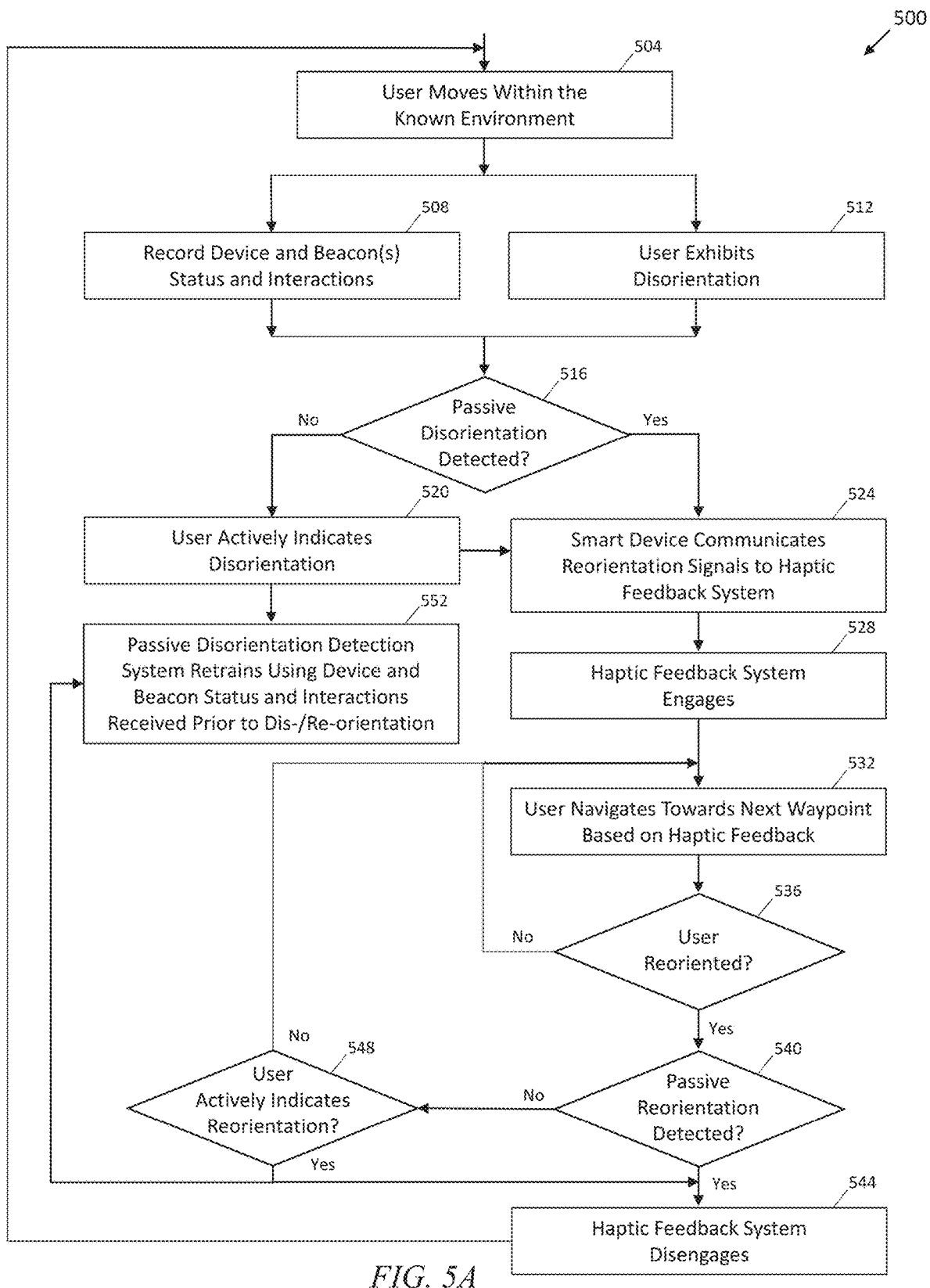
FIG. 5A is an example workflow for guiding a visually impaired individual, in accordance with an example embodiment.

FIG. 5A is an example workflow 500 for guiding a visually impaired individual, in accordance with an example embodiment. In one example embodiment, a user moves within a known environment (operation 504). At some point, the user becomes disoriented (operation 512) while a continuously active passive disorientation detector attempts to determine the status of the user: properly oriented or disoriented (operation 516). If the user is suspected of being disoriented (YES branch of operation 516), the smart device 304 is activated to communicate reorientation signals to the continuous haptic feedback system 320 (operation 524), the continuous haptic feedback system 320 is engaged (operation 528), and the user navigates towards a known waypoint following the guidance provided by the haptic feedback system 320 (operation 532).

A determination is made of whether the user has been reoriented (operation 536). In one example embodiment, if the user starts moving toward the next waypoint, the user is assumed to be reoriented. If the user is not determined to be reoriented (NO branch of operation 536), the method 500 proceeds with operation 532 and the haptic feedback system 320 continues to guide the user to a waypoint. If the user is determined to be reoriented (YES branch of operation 536), the continuously active passive disorientation detector attempts to determine if the user is reoriented (operation 540). If the user is determined to be reoriented (YES branch of operation 540), the continuous haptic feedback system 320 disengages (operation 544) and the method 500 proceeds with operation 504. If the user is not determined to be reoriented (NO branch of operation 540), a check is performed to determine if the user actively indicates reorientation to the system using the smart device 304 (operation 548). If the user actively indicates reorientation to the system (YES branch of operation 548), the passive disorientation detector retrains using status and interaction information of the smart device 304 and the locator beacons 316 prior to the dis-/re-orientation (operation 552) and the continuous haptic feedback system 320 disengages (operation 544). If the user does not actively indicate reorientation to the system (NO branch of operation 548), the method 500 proceeds with operation 532.

Returning to operation 516, if the user is not suspected of being disoriented (NO branch of operation 516), the user has become disoriented and the system has not automatically detected that the user is disoriented. In this case, the user manually indicates that the user is currently disoriented (operation 520) and the method 500 proceeds with operation 524 to engage the reorientation process. Additionally, the sequence of events is used as a training exercise to train the system 300 to better detect orientation in the future. Thus, in one example embodiment, the method 500 proceeds with operation 552 and, as described above, the passive disorientation detector retrains using status and interaction information of the smart device 304 and the locator beacons 316 prior to the dis-/re-orientation. Once operation 552 has completed, the system 300 has retrained itself to better passively detect disorientation in the future.

Figure 5B:
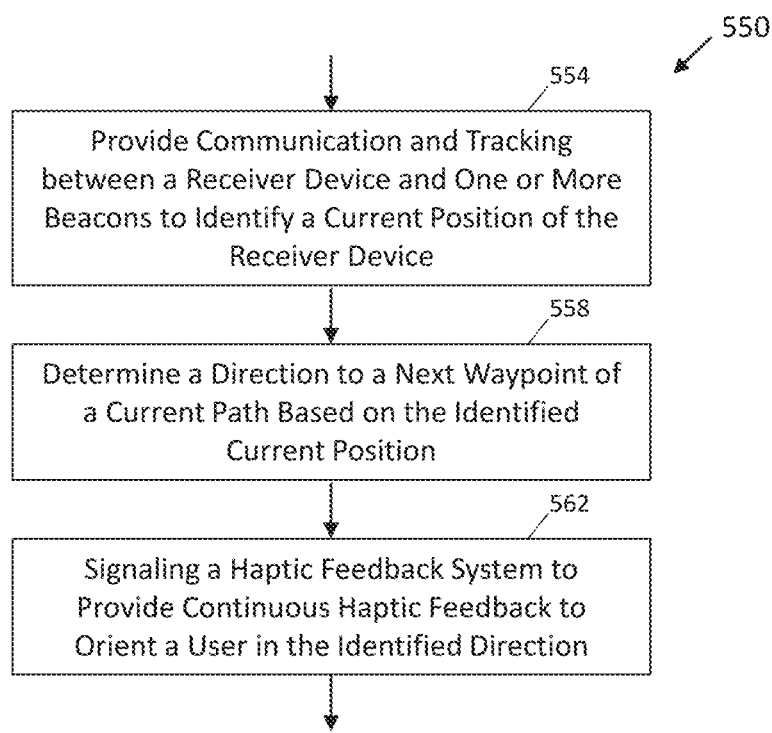
FIG. 5B is a flowchart for an example method for facilitating navigation in a known environment.

FIG. 5B is a flowchart for an example method 550 for facilitating navigation in a known environment, in accordance with an example embodiment. In one example embodiment, communication and tracking is provided between a receiver device 308 and one or more beacons 316 to identify a current position of the receiver device 308 (operation 554). A direction to a next waypoint of a current path is determined based on the identified current position (operation 558); and a haptic feedback system 320 is signaled to provide continuous haptic feedback to orient a user in the identified direction (operation 562). In one example embodiment, the operations of method 550 are performed by the smart device 304 in conjunction with the receiver device 308. In one example embodiment, the receiver device 308 is a component of the smart device 304. In one example embodiment, operations of the method 550, such as the determination of the direction to a next waypoint of a current path, are performed in conjunction with a cloud environment.

Smart Cane Haptic Actuators

Figure 6:
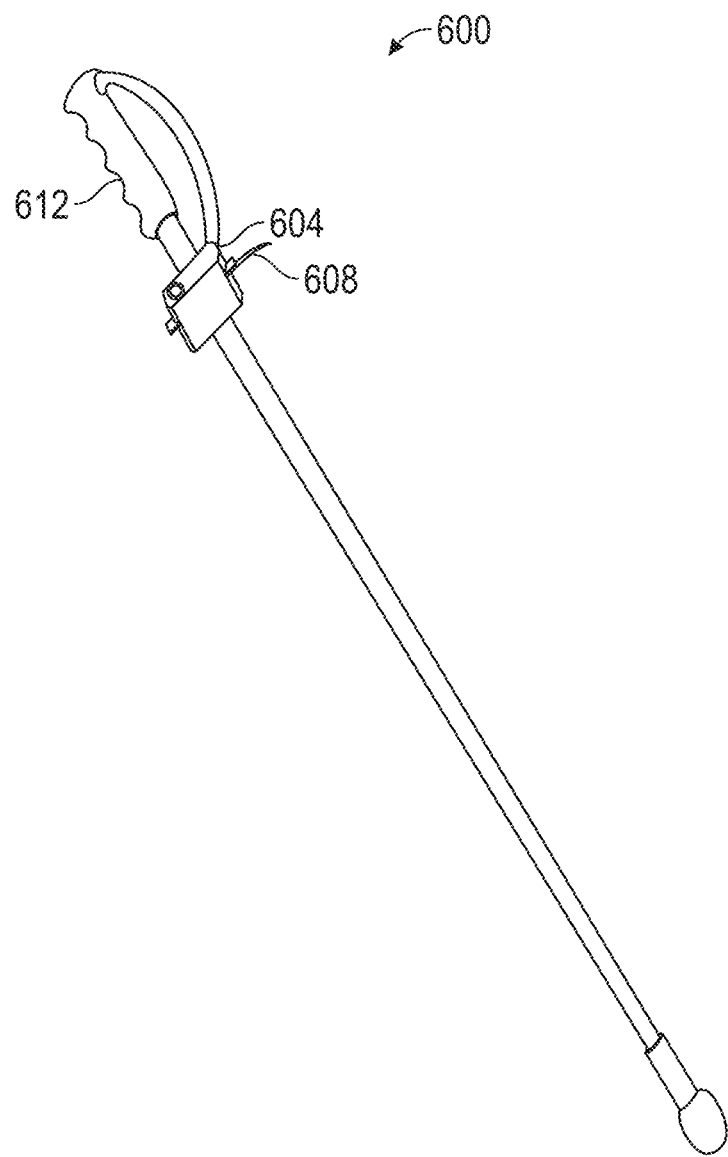
FIG. 6 is an illustration of a haptic feedback cane, in accordance with an example embodiment.

In one example embodiment, the continuous haptic feedback system is implemented with a plurality of motors embedded or attached to a cane (such as towards the front and/or back of the impaired persons hand), providing actuation in opposite directions to create a rotational pivot about a fixed axis and guide the user towards the direction of a waypoint. FIG. 6 is an illustration of a haptic feedback cane 600, in accordance with an example embodiment. As illustrated in FIG. 6, a servo motor 604 and horn 608 are attached to the cane 600, which is wrapped with a rubber tube (not shown to avoid clutter). The user can feel the position of the horn 608 (which moves left or right) under the cane handle 612 with the user's index finger, so that the horn 608 acts as a pointer. In one example embodiment, a weight (not shown) is attached to the horn 608 so that the user can feel the unbalanced weight acting against the cane handle 612. Actuation intensity and haptic patterns can vary as the user becomes realigned with the orientation and/or distance to the waypoint. Similar methods of haptic reorientation can be provided by a plurality of devices, such as smart phones, smart wearables (such as watches, bracelets, hairbands, smart wallets, and smart shoes), purpose-built devices, and the like.

Given the discussion thus far, it will be appreciated that, in general terms, an exemplary method, according to an aspect of the invention, an exemplary method to facilitate navigation in a known environment includes the operations of providing communication and tracking between a receiver device 308 and one or more beacons 316 to identify a current position of the receiver device 308 (operation 508, 554); determining a direction to a next waypoint of a current path based on the identified current position (operations 524, 528, 532, 558); and signaling a haptic feedback system to provide continuous haptic feedback to orient a user in the identified direction (operation 532, 562).

In one example embodiment, the current path is identified by analyzing a movement of the user in the known environment. In one example embodiment, the next waypoint is at least one of a closest reference point, a starting reference point of the current path, a last reference point encountered by the user, a default reference point, and a reference point specified by the user. In one example embodiment, the one or more beacons 316 are placed in one or more fixed locations in the known environment, each beacon 316 to be used as a static waypoint that transmits navigation signals to the receiver device 308. In one example embodiment, a triangulation technique is used to detect a position of the user at a non-beacon waypoint and using the detected location to guide the user to the next waypoint. In one example embodiment, a disorientation model is trained based on location data for the user during one or more journeys and using the disorientation model to determine if the user appears disoriented.

In one example embodiment, the disorientation detection model automatically detects when passive haptic signals are ignored, the method further comprising disengaging a haptic feedback system in response to detecting that the passive haptic signals are being ignored (operation 544). In one example embodiment, a disorientation of the user is detected by analyzing a movement of the user in relation to the current path (operations 508, 512, 516). In one example embodiment, the haptic feedback system 320 is engaged in response to a user actively indicating disorientation (operations 532, 548). In one example embodiment, the haptic feedback system 320 is engaged in response to a passive detection of disorientation of the user (operations 516, 524, 528). In one example embodiment, wherein the determining operation is at least partially performed in a cloud environment. In one example embodiment, tension is applied to a back side and/or a front side of each suspender 330 of a pair of suspenders 330 (operations 528, 532).

In one example embodiment, both suspenders 330 are tensioned to the front side to indicate that the next waypoint is in front of the user, both suspenders 330 are tensioned to only the back side to indicate that the next waypoint is behind the user, the left suspender 330 is tensioned in only the back side and the right suspender 330 is tensioned in only the front side to indicate that the next waypoint is towards a left side of the user, and the right suspender 330 is tensioned in only the back side and the left suspender 330 is tensioned in only the front side to indicate that the next waypoint is towards a right side of the user. In one example embodiment, one or more motors 370 are controlled to generate actuation in opposite directions to create a rotational pivot about a fixed axis of a cane 600 to orient the user towards a direction of the next waypoint. Generally, the wording of "both suspenders are tensioned toward the front side" implies that there is more tension on the front side than the rear side, and does not necessarily mean that all tension is directed to the front side; similarly, toward any other side/direction.

In one example embodiment, the haptic feedback system 320 identifies the next waypoint using short haptic feedback patterns (operation 532). In one example embodiment, the user identifies the next waypoint. In one example embodiment, responsive to the signaling, the continuous haptic feedback is provided to orient the user in the identified direction.

In one aspect, a non-transitory computer readable medium comprises computer executable instructions which when executed by a computer cause the computer to perform the method of: providing communication and tracking between a receiver device 308 and one or more beacons 316 to identify a current position of the receiver device 308 (operation 508, 554); determining a direction to a next waypoint of a current path based on the identified current position (operations 524, 528, 532, 558); and signaling a haptic feedback system to provide continuous haptic feedback to orient a user in the identified direction (operation 532, 562).

In one aspect, an exemplary system includes a haptic feedback system 320 configured to provide haptic feedback to a user; and a smart device 304 in communication with the haptic feedback system (in a non-limiting example, wirelessly). The smart device is configured to provide communication and tracking between a receiver device 308 and one or more beacons 316-1, 317-2, 316-3 to identify a current position of the receiver device; determine a direction to a next waypoint of a current path based on the identified current position; and signal the haptic feedback system to provide continuous haptic feedback to orient the user in the identified direction. As noted elsewhere, in some instances, the receiver device is part of the smart device. The smart device can be configured to carry out the indicated steps by, for example, programming a processor of the smart device.

Refer generally to the discussion of FIG. 7 below. In some instances, the system includes only the haptic feedback system and smart device and the beacons and receiver device are workpieces that interact with the system. In some instances, the system also includes the receiver device, as part of the smart device or separate. In some instances, the system further includes the beacons.

In one example embodiment, the haptic feedback system 320 comprises a pair of suspenders 330 and one or more motors 370 coupled to the suspenders 330, the one or more motors 370 configured to tension each suspender 330 at one or more of a back side and a front side.

In one example embodiment, the haptic feedback system 320 comprises a cane 600 and one or more motors 604 coupled to the cane 600, the one or more motors 604 providing actuation in opposite directions to create a rotational pivot about a fixed axis of the cane 600 to orient the user towards a direction of the next waypoint.

The disclosed system is directed to guiding visually persons, such as impaired persons, in a familiar environment. In one example embodiment, the system considers navigation in a familiar environment, implying that the user is already aware of both the direction and obstacles that exist along the path. The system addresses, for example, the particular problem where a visually impaired person gets disoriented when navigating a familiar environment, and needs to be guided back to a previously known reference point. The system focuses on short distances (between waypoints) as opposed to existing source to destination systems, and in making use of the natural way that visually impaired persons navigate, that is, using reference points to monitor errors in navigation. This is accomplished by providing waypoints to reorient navigation.

In one example embodiment, continuous haptic feedback is provided (similar to having a person's hands on your shoulders "nudging" you in the right direction). In one example embodiment, a learning system is provided for learning new waypoints. In one example embodiment, static waypoints are used that are familiar to a visually impaired person and are navigated to when the user is disoriented in a familiar environment.

One or more embodiments of the invention, or elements thereof, can be implemented in the form of an apparatus including a memory and at least one processor that is coupled to the memory and operative to perform exemplary method steps. FIG. 7 depicts a computer system that may be useful in implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 7:
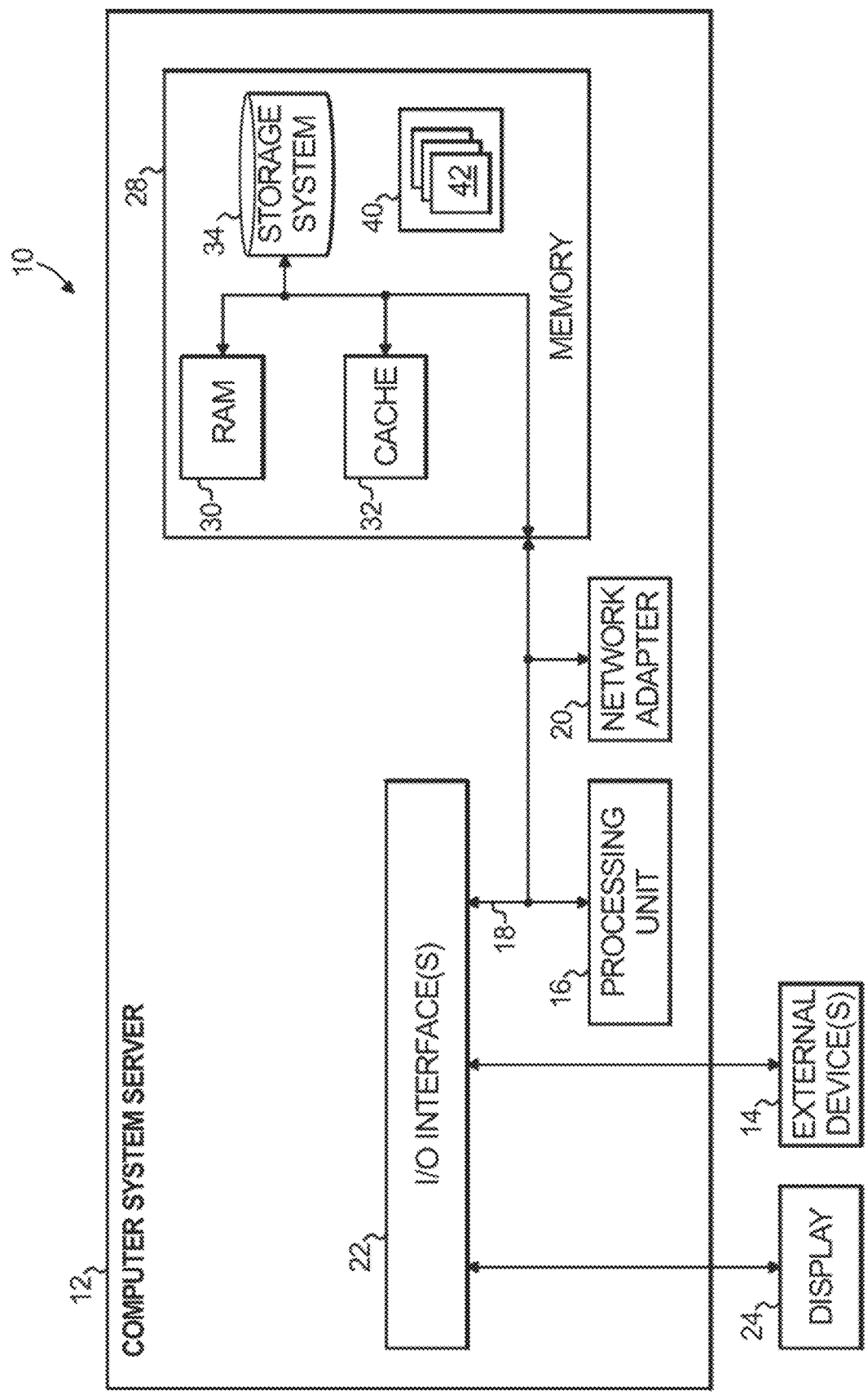
FIG. 7 depicts a computer system that may be useful in implementing one or more aspects and/or elements of the invention, also representative of a cloud computing node according to an embodiment of the present invention.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to facilitate navigation in a known environment, the method comprising:
   providing communication and tracking between a receiver device and one or more beacons to identify a current position of the receiver device;
   determining a direction to a next waypoint of a current path based on the identified current position;
   signaling a haptic feedback system to provide continuous haptic feedback to orient a user in the identified direction; and
   controlling one or more motors to generate actuation in opposite directions to create a rotational pivot about a fixed axis of a cane to orient the user towards a direction of the next waypoint.

2. The method of claim 1, further comprising identifying the current path by analyzing a movement of the user in the known environment.

3. The method of claim 1, wherein the next waypoint is at least one of a closest reference point, a starting reference point of the current path, a last reference point encountered by the user, a default reference point, and a reference point specified by the user.

4. The method of claim 1, further comprising placing the one or more beacons in one or more fixed locations in the known environment, each beacon to be used as a static waypoint that transmits navigation signals to the receiver device.

5. The method of claim 1, further comprising using a triangulation technique to detect a position of the user at a non-beacon waypoint and using the detected location to guide the user to the next waypoint.

6. The method of claim 1, further comprising training a disorientation model based on location data for the user during one or more journeys and using the disorientation model to determine if the user appears disoriented.

7. The method of claim 6, wherein the disorientation detection model automatically detects when passive haptic signals are ignored, the method further comprising disengaging a haptic feedback system in response to detecting that the passive haptic signals are being ignored.

8. The method of claim 1, further comprising detecting a disorientation of the user by analyzing a movement of the user in relation to the current path.

9. The method of claim 1, wherein the haptic feedback system is engaged in response to a user actively indicating disorientation.

10. The method of claim 1, wherein the haptic feedback system is engaged in response to a passive detection of disorientation of the user.

11. The method of claim 1, wherein the determining operation is at least partially performed in a cloud environment.

12. The method of claim 1, further comprising applying tension to a back side and/or a front side of each suspender of a pair of suspenders, responsive to the signaling.

13. The method of claim 12, wherein both suspenders are tensioned toward the front side to indicate that the next waypoint is in front of the user, both suspenders are tensioned toward the back side to indicate that the next waypoint is behind the user, the left suspender is tensioned toward the back side and the right suspender is tensioned toward the front side to indicate that the next waypoint is towards a left side of the user, and the right suspender is tensioned toward the back side and the left suspender is tensioned toward the front side to indicate that the next waypoint is towards a right side of the user.

14. The method of claim 1, wherein the haptic feedback system identifies the next waypoint using short haptic feedback patterns.

15. The method of claim 1, further comprising, responsive to the signaling, providing the continuous haptic feedback to orient the user in the identified direction.

16. A system comprising:
a haptic feedback system configured to provide haptic feedback to a user; and
a smart device in communication with the haptic feedback system and configured to:
provide communication and tracking between a receiver device and one or more beacons to identify a current position of the receiver device;
determine a direction to a next waypoint of a current path based on the identified current position; and
signal the haptic feedback system to provide continuous haptic feedback to orient the user in the identified direction, wherein the haptic feedback system comprises a pair of suspenders and one or more motors coupled to the suspenders, the one or more motors configured to tension each suspender at one or more of a back side and a front side.

17. A system comprising:
a haptic feedback system configured to provide haptic feedback to a user; and
a smart device in communication with the haptic feedback system and configured to:
provide communication and tracking between a receiver device and one or more beacons to identify a current position of the receiver device;
determine a direction to a next waypoint of a current path based on the identified current position; and
signal the haptic feedback system to provide continuous haptic feedback to orient the user in the identified direction, wherein the haptic feedback system comprises a cane and one or more motors coupled to the cane, the one or more motors providing actuation in opposite directions to create a rotational pivot about a fixed axis of the cane to orient the user towards a direction of the next waypoint.

* * * * *